United States Patent
Lin et al.

(10) Patent No.: US 8,949,242 B1
(45) Date of Patent: Feb. 3, 2015

(54) SEMANTIC DOCUMENT ANALYSIS

(75) Inventors: Zhen Lin, Bellevue, WA (US); Keith Stevens, Tarzana, CA (US)

(73) Assignee: Google Inc., Mountain View, CA (US)

( * ) Notice: Subject to any disclaimer, the term of this patent is extended or adjusted under 35 U.S.C. 154(b) by 198 days.

(21) Appl. No.: 13/011,456

(22) Filed: Jan. 21, 2011

Related U.S. Application Data

(60) Provisional application No. 61/297,181, filed on Jan. 21, 2010.

(51) Int. Cl.
*G06F 17/30* (2006.01)

(52) U.S. Cl.
USPC ......................................... 707/739

(58) Field of Classification Search
CPC ................ G06F 17/30731; G06F 17/2785
USPC .......................................... 707/739
See application file for complete search history.

(56) References Cited

U.S. PATENT DOCUMENTS

| | | | |
|---|---|---|---|
| 8,005,841 B1 * | 8/2011 | Walsh et al. ................. | 707/739 |
| 2005/0138028 A1 * | 6/2005 | Liu et al. ........................ | 707/5 |

OTHER PUBLICATIONS

"What Is LSA?", [retrieved on Jan. 20, 2010], Retrieved from the Internet: <URL: http://lsa3.colorado.edu/whatis.html>, 4 pages.
"Vector Space Model", [retrieved on Jan. 20, 2010], Wikipedia, Retrieved from the Internet: <URL: http://en.wikipedia.org/w/index. php?ti%E2%80%A6>, 4 pages.
Landauer, Thomas K., et al., "An Introduction to Latent Semantic Analysis", Discourse processes 25:2-3) (Jul. 1, 1998), pp. 259-294.

* cited by examiner

*Primary Examiner* — Huawen Peng
(74) *Attorney, Agent, or Firm* — Fish & Richardson P.C.

(57) ABSTRACT

Methods, systems, and apparatus, including computer programs encoded on a computer storage medium, for semantic document analysis. In one aspect, methods include the actions of segmenting a document into segments; generating semantic representations, each corresponding to one of the segments; determining a corresponding segment score for one or more of the segments based on the corresponding semantic representation, such that each segment score represents a change in the corresponding segment; comparing each segment score to a threshold score, such that the threshold score represents an expectation of change for the document; and identifying segments having segment scores that indicate the change in the corresponding segment deviates from the expectation of change for the document based on the comparison.

25 Claims, 3 Drawing Sheets

SEMANTIC DOCUMENT ANALYSIS

CROSS-REFERENCE TO RELATED APPLICATIONS

Under 35 U.S.C. §119, this application claims benefit of U.S. Provisional Application Ser. No. 61/297,181, filed Jan. 21, 2010, the entire contents of which are hereby incorporated by reference.

BACKGROUND

This specification relates to semantic document analysis.

When a webpage's content changes, some of the changes are relevant to what an end user would believe is the main content of the webpage. Other updates to the webpage may be irrelevant to what an end user would believe is the main content of the webpage, e.g. a change in an advertisement. Some changes to a webpage can be detected by structural analysis of the document, such as changes in the Document Object Model (DOM) structure and detection of new text with filtering done by boilerplate detection.

SUMMARY

A framework is provided to perform time series analysis of semantic changes in documents that helps to detect changes between versions of the same document that are relevant to a main topic of the document. This may be accomplished, for example, by generating semantic vectors representing current and previous versions of a document and segments of the document. The similarity between the vectors and changes in similarity are then monitored over time to determine whether the content provided in a segment of the document relates to the main topic of the document, or whether the segment has changed in a statistically expected way. In this way, the most important and relevant segments of a document may be identified and distinguished from segments that do not behave in a statistically expected way.

In general, one innovative aspect of the subject matter described in this specification can be embodied in methods that include the actions of segmenting a document into segments; generating semantic representations, each corresponding to one of the segments; determining a corresponding segment score for one or more of the segments based on the corresponding semantic representation, such that each segment score represents a change in the corresponding segment; comparing each segment score to a threshold score, such that the threshold score represents an expectation of change for the document; and identifying segments having segment scores that indicate the change in the corresponding segment deviates from the expectation of change for the document based on the comparison. Other embodiments of this aspect include corresponding systems, apparatus, and computer programs, configured to perform the actions of the methods, encoded on computer storage devices.

These and other embodiments can each optionally include one or more of the following features. Determining a corresponding segment score for one or more of the segments based on the corresponding semantic representation can include determining a measure of similarity between the corresponding semantic representation of a first segment and a previous semantic representation of the first segment; determining an average measure of similarity between consecutive semantic representations of the first segment; and determining a difference between the measure of similarity and the average measure of similarity, such that the corresponding segment score is based, at least in part, on the difference. The corresponding semantic representation of the first segment and the previous semantic representation can be L2 normalized vectors, and determining the measure of similarity can include computing a dot product between the corresponding semantic representation of the first segment and the previous semantic representation. Determining a corresponding segment score for one or more of the segments based on the corresponding semantic representation can include determining a measure of similarity between the corresponding semantic representation of a first segment and an average semantic representation of the first segment, the average semantic representation derived from prior semantic representations of the first segment; determining an average measure of similarity between a previous semantic representation of the first segment and a previous average semantic representation of the first segment, the previous average semantic representation derived from earlier semantic representations of the first segment; and determining a difference between the measure of similarity and the average measure of similarity, such that the corresponding segment score is based, at least in part, on the difference. Determining a corresponding segment score for one or more of the segments based on the corresponding semantic representation can include determining a measure of similarity between the corresponding semantic representation of a first segment and a semantic representation of the document; determining an average measure of similarity between previous semantic representations of the first segment and previous semantic representations of the document; and determining a difference between the measure of similarity and the average measure of similarity, such that the corresponding segment score is based, at least in part, on the difference. The acts can include: filtering segments identified as having segment scores that indicate the change in the corresponding segment deviates from the expectation of change for the document; and generating a semantic representation for the document based on semantic representations corresponding to unfiltered segments. Generating semantic representations, each corresponding to one of the segments, can include forming a semantic vector for one or more of the segments, such that each element of the vector has a weight corresponding to a term frequency-inverse document frequency (TF-IDF) score of a corresponding term in the document.

Particular embodiments of the subject matter described in this specification can be implemented so as to realize one or more of the following advantages. The most important sections of a document can be determined by using observations of different versions of the document and monitoring the semantic deviations of each section of the document over time. Several versions of each document can be analyzed for their semantic content, and the most important and relevant portions of a document can be retained for further use. Relevancy detection can be accomplished by building semantic representations for sections of a document and observing how consistent the sections are over time. Changes to documents that are important can be provided to users as updates in a news feed or other fashion, while changes that users would not find interesting are filtered out. The precision of updates is improved by filtering out unrelated document segments and identification of the main subject of a document.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
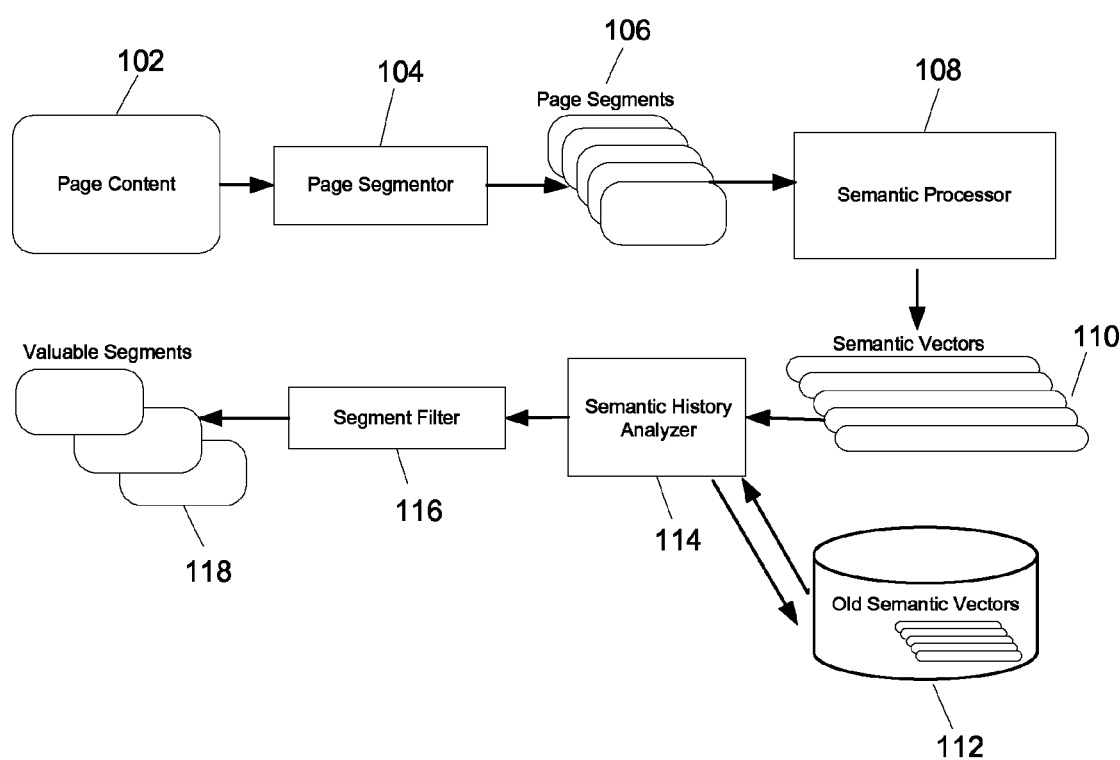
FIG. 1 illustrates an example system for performing semantic analysis of documents.

As shown in FIG. 1, a new version of a document 102, e.g., a webpage, is considered as input to the system 100. A document can be a markup language document, a word processing document, a portable document format (PDF) document, or a feed source, to name just a few. The document 102 is then segmented by a page segmentor 104 into page segments 106 according to, for example, the Hypertext Markup Language (HTML) structure of the document 102. In some implementations, the content is segmented using a set of heuristic rules, e.g., rules based on the use of html tags embedded in the content, to group semantically similar sections together. For example, content from a news resource may be segmented into a latest news section, a front page section, an advertisement section, a hot topic section, and a footer section based on similarities in HTML tags and various common patterns in HTML documents. Other ways of segmenting the document are possible. The segments 106 are provided to a semantic processor 108 which creates a semantic representation 110 for each segment in the form of a semantic vector, for instance.

There are several approaches for forming semantic vectors, such as using the term frequency-inverse document frequency (TF-IDF) score of the terms in the document, a summation of term representations, or a representation based on clusters of related words, for instance. In the case of TF-IDF, term frequencies are counted for a given segment based on some representative corpus used for IDF values, and each term having a non zero frequency can be given a score of TF×IDF. Other semantic representations of document segments are possible. The semantic vectors are then compared to the previous semantic vectors of the corresponding segments by the semantic history analyzer 114. With different representations of a segment, the differences that have taken place can be evaluated, and the characteristics of the document as a whole can be inferred. The information gathered from each segment is used to determine how the document is expected to change with regard to the semantic concepts referenced. Based on the document level inferences, segments can be dropped by the segment filter 116 if they do not behave in a statistically expected way. In some implementations, the remaining segments 118 can be provided to a user news feed or other process.

By performing this analysis over a long period of time, an expectation of how the document as a whole changes is generated. Any segment which does not change in a way described by this expected change can then be discounted, and any updates generated from that segment, for example, based on detected content changes, discarded. Ultimately, this analysis scores each segment based on its relevancy to the main content of the document, so that sections which will drive users to the document will have a higher rating of relevancy, and other sections will have a lower rating.

By way of illustration, suppose a user is tracking a news article webpage about a political figure, where the overall content of the document is regarding the political figure. After documents of this type are published, changes to the main content are expected to be relatively infrequent. But as part of a news site, it's possible that there are other segments of the document which will update regularly, with items such as recent headlines, and are likely to be irrelevant to the main content of the document. A semantic analysis of a document as it changes through time can detect the relevancy of these updates. This analysis can then be used to determine that certain sections of a document contain irrelevant updates, and reduce the number of unwanted updates reported to users.

Figure 2:
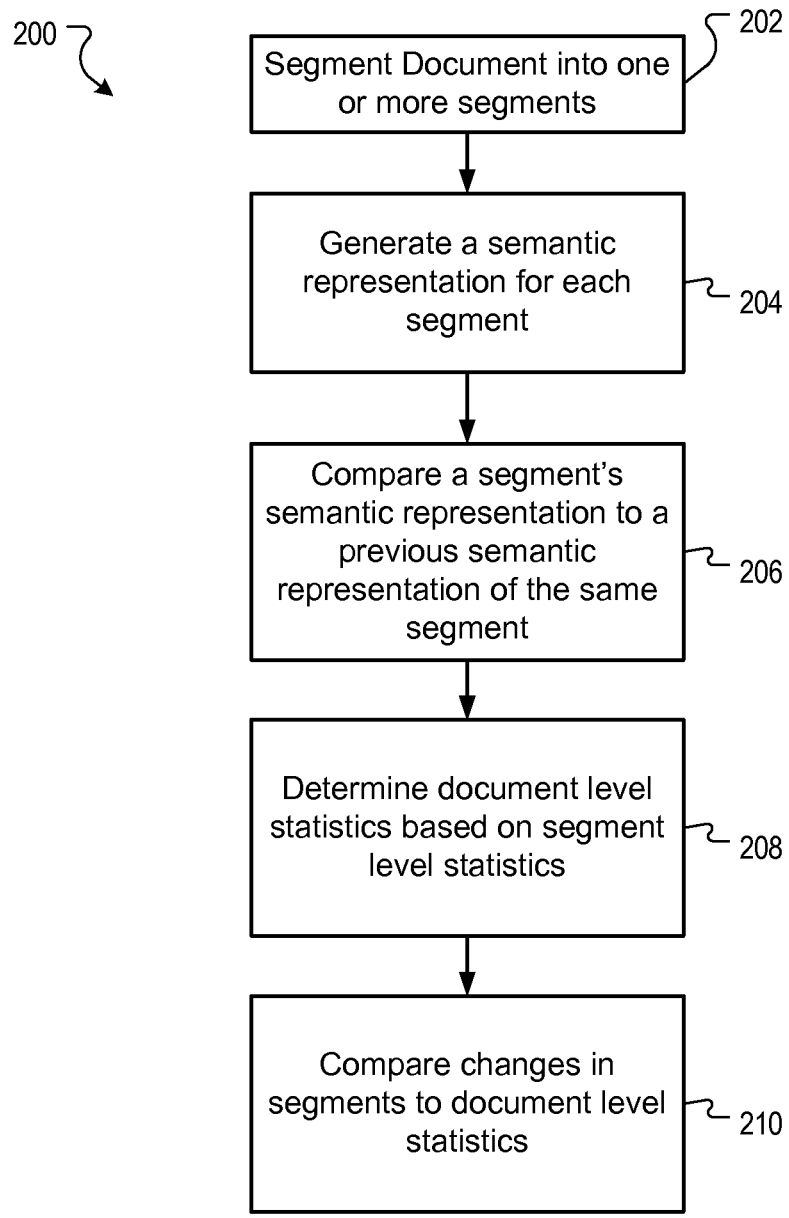
FIG. 2 is a flow chart of a technique for detecting relevant changes to a document.

In some implementations, semantic analysis of documents can be broken up into a series of steps, for example, as illustrated in FIG. 2. As shown in flow chart 200, the semantic analysis is performed by first segmenting a document (202). As noted above with respect to FIG. 1, a document can be segmented, for example, based on the Hypertext Markup Language (HTML) structure of the document. In some implementations, the document is segmented based on similarities in HTML tags and various common patterns in HTML documents. Other ways of segmenting the document are possible. Once the document is segmented, a semantic representation of each segment is generated (204). For example; in some implementations, each segment is represented by a semantic vector consisting of term representations, i.e., vector elements, where term frequencies are counted for a given segment based on some representative corpus used for IDF values, and each term having a non zero frequency is given a score of TF×IDF, where the score is the weight of the term representation in the semantic vector.

Once a current semantic representation is generated for one or more segments of the document, the representation is compared to a previous semantic representation corresponding to the same segment or segments (206). In some implementations, the comparison is performed by determining a similarity between the two semantic representations. For TF×IDF vectors, the similarity can be determined by L2 normalizing the vectors and then calculating the dot product of the two vectors to obtain the cosine of the angle between the vectors. In further implementations, the similarity between two consecutive segment representations of a segment are stored for use in determining how the segment or the document can be expected to change. Other segment level statistics are calculated and maintained for multiple comparisons of a corresponding segment, include, for example, a rolling average of the similarity between two consecutive segment representations over time, the variance of the segment's similarity, the change in similarity between the current comparison and the most recent comparison, the average change in similarity each time two vector pairs are compared, and the variance of this average delta.

Document level statistics are determined (208) based on the segment level statistics, e.g., by drawing inferences from information derived from multiple comparisons obtained over time. The document level statistics, segment level statistics, or a combination thereof, are then combined to represent an expected conceptual change of the document and to determine if current changes to segments conform to the expected change. For example, in some implementations, the expected conceptual change of the document is represented by an average rate of change in the similarity between consecutive semantic representations of a segment, a value indicating the similarity of the segment to the collective representation of the document, and an average rate of change in that value. Once the document level statistics are determined, the changes in segments are compared to the document level statistics (210), for example, to identify changes that are different from an expectation of change for the document. In some implementations, identified changes are utilized to remove segments which consistently change differently from the expectation and to store the most recent representations for remaining segments which can then be used to derive an updated expectation of change for the document. In various implementations, the remaining segments may also be used to distinguish important sections of the document in filtering or sorting documents, or in generating a news feed of relevant updated content.

In some examples, a series of semantic representations are collected by creating a semantic representation of each segment of a document each time the document is updated or input to system 100, for example. The series of semantic representations is used to determine the semantic consistency of a segment and the semantic relevancy of a segment to the main topic at a single point in time and the main topic over the document's history.

Semantic consistency can be defined as the degree to which a segment pertains to a single set of topics. A highly consistent segment would be a single block of text, such as a section of a Wikipedia document, which has a concrete and constant focus. A highly inconsistent segment would be a news headline section of a document, where on each update any recent headline could potentially be part of the content.

In some implementations, the semantic consistency of a segment is determined based on the similarity of the most current representation of a segment to its previous representation and an moving average of this similarity. The similarity between two vectors is determined, for example, by the cosine of the angle θ between the two vectors. In some examples, all vectors are L2 normalized, i.e. each vector represents a point on a unit sphere in very high dimensional space, and the similarity between two vectors is determined by taking the dot product of the two vectors.

In addition to determining the similarity between two consecutive segment representations of a segment, various implementations also generate other segment level statistics, including, for example, a rolling average of the similarity between two consecutive segment representations over time, the variance of the segment's similarity, the change in similarity between the current comparison and the most recent comparison, the average change in similarity each time two vector pairs are compared, and the variance of this average delta. In some examples, these segment level statistics and the most recent semantic representation of each segment are stored in a database. In further examples, semantic representations of each segment are maintained over longer periods of time for computing more long term shifts, such as the shift found over one week, or one month.

In some examples, a set of document level statistics representing the document are generated to account for documents having multiple segments. These statistics are generated by computing a set of averages, and variances, over the various segment level statistics. For this, each segment is weighted by the percentage of text the segment contributes to the document as a whole. In further implementations, this weight incorporates the visual presence of the segment in the document, as determined from rendering the document. For instance, in some examples, the weight for each segment is based, at least in part, on the relative size of the segment within the rendered layout such that segments occupying larger areas are weighted more heavily. For example, a segment having a display width greater than 50% of the overall document width and a segment height greater than 50% of the overall document height indicates the segment is a predominant section within the document and is, therefore, likely to be more important than a segment having a much smaller height ratio located at the bottom of the document such as a footer section.

In various implementations, the set of document level statistics includes: the average segment similarity, the variance of segment similarity, the average similarity of segments over time, the variance of the similarity of segments over time, the largest segment size, the similarity of the largest segment with respect to the document vector, the average size of segments, and the variance of the size of segments.

In some implementations, semantic vectors for segments which are within some tight bound of the expected average segment are averaged together to create a document level representation, or "document vector," of the core segments or "main topic" for a document. For example, the document vector in some implementations is calculated as the average of semantic vectors whose similarities are within some standard deviation of the mean of all semantic vectors for the document. In some examples, a damping factor is applied to the document vector, e.g., 0.25. This representation is used to generate, for each segment, a value indicating the similarity of the segment to the collective representation of the document.

The segment level and document level statistics are used to determine and assign, for each segment, a segment score representing the probability that the segment is changing at the same rate as the average segment of the document. In some examples, the full weighted score of a segment is a weighted sum of two probabilities that the segment changes at the expected rate—one from the average similarity, and one from the average similarity over time—and the similarity of the segment to the collective representation of the document, e.g., based on the dot product between the document vector and the document level representation for the segment. This single score captures both how much this segment has changed in the most current update, and how much this segment has changed in general. Segments are discarded if they differ on both dimensions, i.e. they change more than expected consistently over a period of time, and they continue to change more than expected.

In some implementations, the segment score is calculated as 0.1*reference similarity+0.2*similarity score+0.4*average similarity; where reference similarity=the dot product of a current semantic vector for a segment with the document level representation vector or document vector;

$$\text{similarity score} = e^{\left(\frac{-1\cdot(x-average)^2}{1.5\cdot std^2}\right)},$$

where x=the dot product of two consecutive semantic vectors for the same segment, average=the rolling average of this similarity, and std=standard deviation of this similarity; and $$\text{average similarity} = e^{\left(\frac{-1\cdot(x-average)^2}{1.5\cdot std^2}\right)},$$

where x=the similarity between the current semantic vector and the average semantic vector for the same segment, average=the rolling average of this similarity, and std=the standard deviation of these similarities. In this way, the reference similarity provides an indication of the deviation between the semantic representation of a segment and the main topic of the document—i.e., the document vector. The similarity score provides an indication of the deviation between the two most recent semantic representations of a segment and the average deviation between consecutive semantic representations of the segment over time. Finally, the average similarity provides an indication of the deviation between the semantic representation of a segment and the average semantic representation for the same segment over time. Thus, the weighted combination of these components provides a measure of consistency and relevancy such that scores exceeding a threshold indicate the segment has changed in a way that is different from an expected change. Other ways of calculating the document segment score are possible, including using different weights.

Once calculated, the segment score corresponding to each segment of a document is used to determine whether or not the segment should be filtered out. If the segment score is less than some threshold, the segment is considered irrelevant, and thus filtered. For example, in some implementations, if a segment's score is <0.5, the segment is filtered out.

For semantic analysis purposes, pages can be broadly classified as portal pages or subject pages. While subject pages have some segments which change either at a fixed rate, or very infrequently overall, portal pages typically have no real expected amount of change, with each segment changing uniquely, and frequently. For example, documents such as portal web pages or links page provide information from diverse sources such that the document has no consistency over all. Thus, to avoid filtering a significant portion of the document, some implementations limit the size of filtered segments. For example, in some implementations, if, after filtering all the segments of the document, a significant portion of the document is filtered out, then all the filtering is dropped. If the size of filtered segments is below a threshold detailing how much should be dropped, the filtering is maintained.

In some implementations, semantic based information is correlated with external signals such as click-thru rates. For example, if search queries lead to a high click through rate to the document, with few users leaving the document and selecting another search result, they can be viewed as an explicit declaration of the document's main topic. These queries can then be combined together and used to generate a single semantic representation which provides another reference point for relevancy, much like the main topic representation of a document.

Additional correlation can be done between the viewing frequency of a document, and the change frequency of each segment of a document. The intuition behind this is that pages which have a high viewing frequency are viewed often because some segment which updates at a similar rate is determined to be important. So the change frequency of a section can be compared to the overall view frequency of the document to further detect which segment contains the central topic of the document.

An electronic document, which for brevity is simply referred to herein as a document, may, but need not, correspond to a file. A document may be stored in a portion of a file that holds other documents, in a single file dedicated to the document in question, or in multiple coordinated files.

Figure 3:
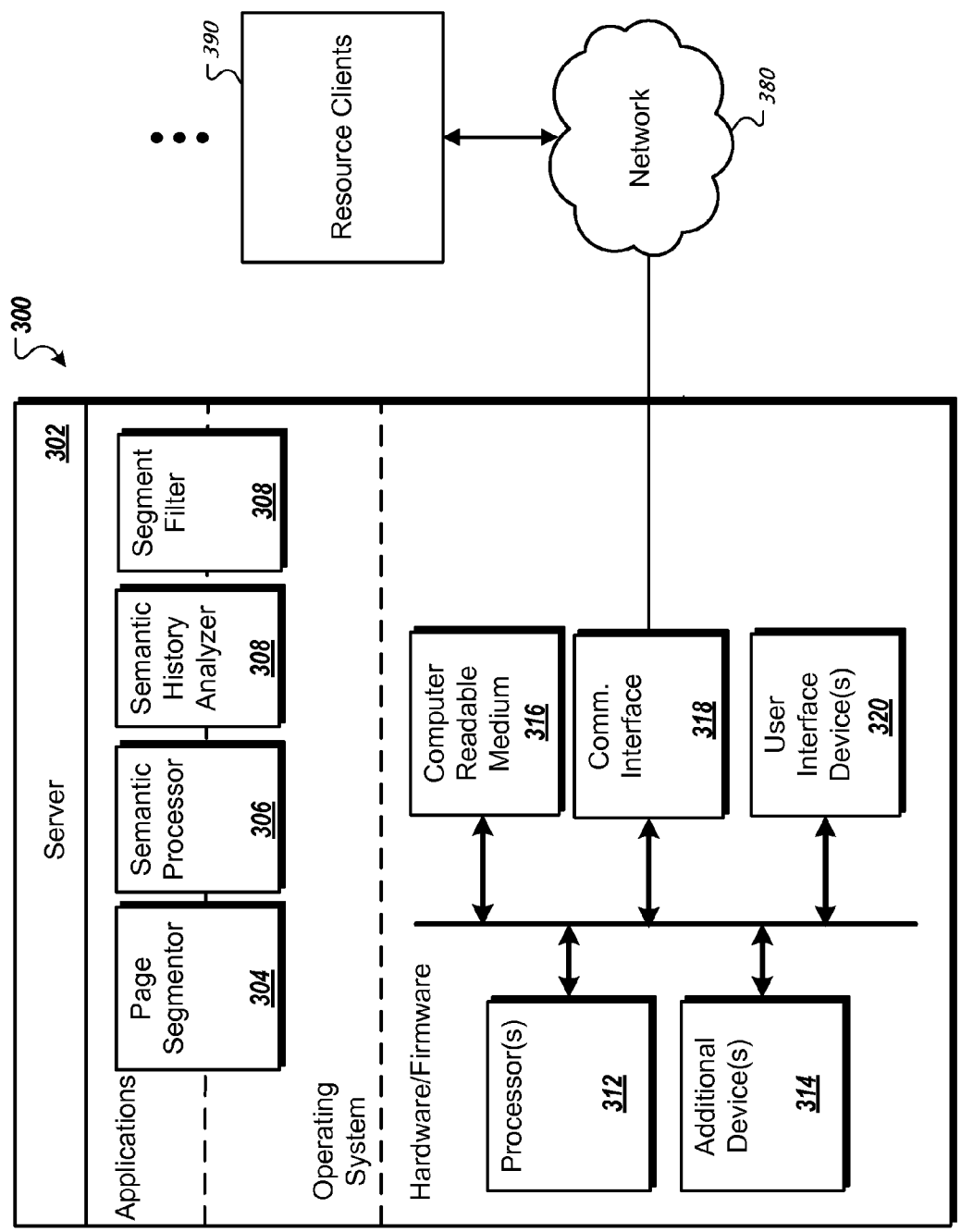
FIG. 3 is a block diagram of a semantic analysis system.

FIG. 3 is a schematic diagram of an example system configured to perform time series analysis of semantic changes in documents that helps to detect changes between versions of the same document that are relevant to a main topic of the document. The system generally consists of a server 302. The server 302 is optionally connected to one or more user or client computers 390 through a network 380. The server 302 consists of one or more data processing apparatus. While only one data processing apparatus is shown in FIG. 3, multiple data processing apparatus can be used. The server 302 includes various modules, e.g. executable software programs, including a page segmentor 304 for segmenting a document into page segments, a semantic processor 306 for generating semantic representations for each segment in the form of semantic vectors, a semantic history analyzer 308 for comparing semantic vectors to previous semantic vectors and for extrapolating an expected conceptual change in the document, and a segment filter 310 for identifying segments that do not behave in a statistically expected way.

Each module runs as part of the operating system on the server 302, runs as an application on the server 302, or runs as part of the operating system and part of an application on the server 302, for instance. Although several software modules are illustrated, there may be fewer or more software modules. Moreover, the software modules can be distributed on one or more data processing apparatus connected by one or more networks or other suitable communication mediums.

The server 302 also includes hardware or firmware devices including one or more processors 312, one or more additional devices 314, a computer readable medium 316, a communication interface 318, and one or more user interface devices 320. Each processor 312 is capable of processing instructions for execution within the server 302. In some implementations, the processor 312 is a single or multi-threaded processor. Each processor 312 is capable of processing instructions stored on the computer readable medium 316 or on a storage device such as one of the additional devices 314. The server 302 uses its communication interface 318 to communicate with one or more computers 390, for example, over a network 380. Examples of user interface devices 320 include a display, a camera, a speaker, a microphone, a tactile feedback device, a keyboard, and a mouse. The server 302 can store instructions that implement operations associated with the modules described above, for example, on the computer readable medium 316 or one or more additional devices 314, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA, or field programmable gate array, or an ASIC, or application-specific integrated circuit. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending documents to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML document, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a first version of a document;
   segmenting the first version of the document into a plurality of segments;
   generating first semantic representations, each first semantic representation corresponding to a respective segment in the first version of the document;
   receiving a second version of the document;
   generating second semantic representations, each second semantic representation corresponding to a respective segment in the second version of the document;
   determining a respective segment score for each of one or more of the segments based on the second semantic representation for the segment in the second version of the document and the first semantic representation for the segment in the first version of the document, wherein the segment score represents a probability that the segment has changed from the first version of the document to the second version of the document at a same rate as an average segment in the document;
   determining, for each of the one or more segments and based on the segment score for the segment, whether a change in the segment deviates from an expectation of change for the document from the first version of the document to the second version of the document; and
   identifying segments having a change that deviates from the expectation of change for the document.

2. The method of claim 1, wherein determining a respective segment score for each of one or more of the segments comprises:
   determining a measure of similarity between the first semantic representation corresponding to the segment and the second semantic representation corresponding to the segment;
   determining an average measure of similarity between consecutive semantic representations of the segment; and
   determining a difference between the measure of similarity and the average measure of similarity, wherein the corresponding segment score is based, at least in part, on the difference.

3. The method of claim 2, wherein the first and second semantic representations of the segment are L2 normalized vectors, and determining the measure of similarity comprises computing a dot product between the first and second semantic representations corresponding to the segment.

4. The method of claim 1, wherein determining a respective segment score for each of one or more of the segments comprises:
   determining a measure of similarity between the second semantic representation corresponding to the segment and an average semantic representation corresponding to the segment, the average semantic representation derived from prior semantic representations of the segment;
   determining an average measure of similarity between a previous semantic representation corresponding to the segment and a previous average semantic representation corresponding to the segment, the previous average semantic representation derived from earlier semantic representations of the segment; and
   determining a difference between the measure of similarity and the average measure of similarity, wherein the corresponding segment score is based, at least in part, on the difference.

5. The method of claim 1, wherein determining a respective segment score for each of one or more of the segments comprises:
   determining a measure of similarity between the second semantic representation corresponding to the segment and a semantic representation of the second version of the document;
   determining an average measure of similarity between previous semantic representations corresponding to the segment and previous semantic representations of previous versions of the document; and
   determining a difference between the measure of similarity and the average measure of similarity, wherein the corresponding segment score is based, at least in part, on the difference.

6. The method of claim 1, further comprising:
   filtering segments identified as having a change that deviates from the expectation of change for the document; and
   generating a semantic representation for the second version of the document based on second semantic representations corresponding to unfiltered segments.

7. The method of claim 1, wherein generating the second semantic representations comprises forming a semantic vector for the corresponding segment, wherein each element of the vector has a weight corresponding to a term frequency-inverse document frequency (TF-IDF) score of a corresponding term in the document.

8. The method of claim 1, wherein the expectation of change for the document is determined based on (i) an average rate of change in the similarity between consecutive semantic representations of a segment, (ii) a value indicating the similarity of the segment to the collective representation of the document, and (iii) an average rate of change in the value indicating the similarity.

9. The method of claim 1, wherein segmenting the first version of the document comprises segmenting the first version of the document based on a code structure of the first version of the document.

10. A non-transitory computer storage medium encoded with a computer program, the program comprising instructions that when executed by data processing apparatus cause the data processing apparatus to perform operations comprising:
    receiving a first version of a document;
    segmenting the first version of the document into a plurality of segments;

generating first semantic representations, each first semantic representation corresponding to a respective segment in the first version of the document;

receiving a second version of the document;

generating second semantic representations, each second semantic representation corresponding to a respective segment in the second version of the document;

determining a respective segment score for each of one or more of the segments based on the semantic representation for the segment in the second version of the document and the first semantic representation for the segment in the first version of the document, wherein the segment score represents a probability that the segment has changed from the first version of the document to the second version of the document at a same rate as an average segment in the document;

determining, for each of the one or more segments and based on the segment score for the segment, whether a change in the segment deviates from an expectation of change for the document from the first version of the document to the second version of the document; and identifying segments having a change that deviates from the expectation of change for the document.

11. The non-transitory computer storage medium of claim 10, wherein determining a respective segment score for each of one or more of the segments comprises:

determining a measure of similarity between the first semantic representation corresponding to the segment and the second semantic representation corresponding to the segment;

determining an average measure of similarity between consecutive semantic representations of the segment; and determining a difference between the measure of similarity and the average measure of similarity, wherein the corresponding segment score is based, at least in part, on the difference.

12. The non-transitory computer storage medium of claim 11, wherein the first and second semantic representations of the segment are L2 normalized vectors, and determining the measure of similarity comprises computing a dot product between the first and second semantic representations corresponding to the segment.

13. The non-transitory computer storage medium of claim 10, wherein determining a respective segment score for each of one or more of the segments comprises:

determining a measure of similarity between the second semantic representation corresponding to the segment and an average semantic representation corresponding to the segment, the average semantic representation derived from prior semantic representations of the segment;

determining an average measure of similarity between a previous semantic representation corresponding to the segment and a previous average semantic representation corresponding to the segment, the previous average semantic representation derived from earlier semantic representations of the segment; and determining a difference between the measure of similarity and the average measure of similarity, wherein the corresponding segment score is based, at least in part, on the difference.

14. The non-transitory computer storage medium of claim 10, wherein determining a respective segment score for each of one or more of the segments comprises:

determining a measure of similarity between the second semantic representation corresponding to the segment and a semantic representation of the second version of the document;

determining an average measure of similarity between previous semantic representations corresponding to the segment and previous semantic representations of previous versions of the document; and determining a difference between the measure of similarity and the average measure of similarity, wherein the corresponding segment score is based, at least in part, on the difference.

15. The non-transitory computer storage medium of claim 10, wherein the operations further comprise:

filtering segments identified as having a change that deviates from the expectation of change for the document; and generating a semantic representation for the second version of the document based on second semantic representations corresponding to unfiltered segments.

16. The non-transitory computer storage medium of claim 10, wherein generating the second semantic representations, comprises forming a semantic vector for the corresponding segment, wherein each element of the vector has a weight corresponding to a term frequency-inverse document frequency (TF-IDF) score of a corresponding term in the document.

17. The non-transitory computer storage medium of claim 10, wherein the expectation of change for the document is determined based on (i) an average rate of change in the similarity between consecutive semantic representations of a segment, (ii) a value indicating the similarity of the segment to the collective representation of the document, and (iii) an average rate of change in the value indicating the similarity.

18. A system comprising:

one or more computers operable to perform operations comprising:

receiving a first version of a document;

segmenting the first version of the document into a plurality of segments;

generating first semantic representations, each first semantic representation corresponding to a respective segment in the first version of the document;

receiving a second version of the document;

generating second semantic representations, each second semantic representation corresponding to a respective segment in the second version of the document;

determining a respective segment score for each of one or more of the segments based on the second semantic representation for the segment in the second version of the document and the first semantic representation for the segment in the first version of the document, wherein the segment score represents a probability that the segment has changed from the first version of the document to the second version of the document at a same rate as an average segment in the document;

determining, for each of the one or more segments and based on the segment score for the segment, whether a change in the segment deviates from an expectation of change for the document from the first version of the document to the second version of the document; and identifying segments having a change that deviates from the expectation of change for the document.

19. The system of claim 18, wherein determining a respective segment score for each of one or more of the segments comprises:
- determining a measure of similarity between the first semantic representation corresponding to the segment and the second semantic representation corresponding to the segment;
- determining an average measure of similarity between consecutive semantic representations of the segment; and
- determining a difference between the measure of similarity and the average measure of similarity, wherein the corresponding segment score is based, at least in part, on the difference.

20. The system of claim 19, wherein the first and second semantic representations of the segment are L2 normalized vectors, and determining the measure of similarity comprises computing a dot product between the first and second semantic representations corresponding to the segment.

21. The system of claim 18, wherein determining a respective segment score for each of one or more of the segments comprises:
- determining a measure of similarity between the second semantic representation corresponding to the segment and an average semantic representation corresponding to the segment, the average semantic representation derived from prior semantic representations of the first segment;
- determining an average measure of similarity between a previous semantic representation corresponding to the segment and a previous average semantic representation corresponding to the segment, the previous average semantic representation derived from earlier semantic representations of the segment; and
- determining a difference between the measure of similarity and the average measure of similarity, wherein the corresponding segment score is based, at least in part, on the difference.

22. The system of claim 18, wherein determining a respective segment score for each of one or more of the segments comprises:
- determining a measure of similarity between the second semantic representation corresponding to the segment and a semantic representation of the second version of the document;
- determining an average measure of similarity between previous semantic representations corresponding to the segment and previous semantic representations of previous versions the document; and
- determining a difference between the measure of similarity and the average measure of similarity, wherein the corresponding segment score is based, at least in part, on the difference.

23. The system of claim 18, wherein the operations further comprise:
- filtering segments identified as having a change that deviates from the expectation of change for the document; and
- generating a semantic representation for the second version of the document based on second semantic representations corresponding to unfiltered segments.

24. The system of claim 18, wherein generating the second semantic representations comprises forming a semantic vector for the corresponding segment, wherein each element of the vector has a weight corresponding to a term frequency-inverse document frequency (TF-IDF) score of a corresponding term in the document.

25. The system of claim 18, wherein the expectation of change for the document is determined based on (i) an average rate of change in the similarity between consecutive semantic representations of a segment, (ii) a value indicating the similarity of the segment to the collective representation of the document, and (iii) an average rate of change in the value indicating the similarity.

* * * * *